United States Patent
Chen

(10) Patent No.: US 11,994,769 B1
(45) Date of Patent: May 28, 2024

(54) BACKLIT DISPLAY DEVICE WITH TAPERED REFLECTIVE CUP ARRAY

(71) Applicant: E-LEAD ELECTRONIC CO., LTD., Changhua (TW)

(72) Inventor: Stephen Chen, Changhua (TW)

(73) Assignee: E-LEAD ELECTRONIC CO., LTD., Changhua (TW)

( * ) Notice: Subject to any disclaimer, the term of this patent is extended or adjusted under 35 U.S.C. 154(b) by 0 days.

(21) Appl. No.: 18/503,375

(22) Filed: Nov. 7, 2023

(30) Foreign Application Priority Data

Jul. 20, 2023 (TW) .................................. 112127150

(51) Int. Cl.
  *G02F 1/13357* (2006.01)
  *F21V 8/00* (2006.01)
  *G02B 27/01* (2006.01)

(52) U.S. Cl.
  CPC ..... *G02F 1/133603* (2013.01); *G02B 6/0051* (2013.01); *G02B 27/01* (2013.01); *G02F 1/133606* (2013.01); *G02F 1/133608* (2013.01); *G02B 2027/0196* (2013.01)

(58) Field of Classification Search
  CPC ...... G02F 1/133317; G02B 2027/0118; G02B 19/0066; B60K 35/23
  See application file for complete search history.

(56) References Cited

U.S. PATENT DOCUMENTS

| | | | |
|---|---|---|---|
| 11,347,102 B2* | 5/2022 | Mifune | G02F 1/133606 |
| 2002/0021501 A1* | 2/2002 | Kawashima | G02B 6/262 |
| | | | 358/451 |
| 2016/0147061 A1* | 5/2016 | Nambara | B60K 35/00 |
| | | | 359/631 |
| 2017/0337885 A1* | 11/2017 | Aoki | G02F 1/133606 |
| 2019/0031028 A1* | 1/2019 | Nambara | B60K 35/23 |
| 2022/0155589 A1* | 5/2022 | Hirata | G03B 21/62 |
| 2022/0342230 A1* | 10/2022 | Chen | G02B 27/0101 |
| 2022/0373817 A1* | 11/2022 | Chen | G02B 5/0215 |
| 2023/0050692 A1* | 2/2023 | Chen | G03B 21/2066 |
| 2023/0111590 A1* | 4/2023 | Chen | G02B 5/09 |
| | | | 359/630 |

* cited by examiner

*Primary Examiner* — Andrew J Coughlin
(74) *Attorney, Agent, or Firm* — Guice Patents PLLC

(57) ABSTRACT

A backlit display device includes a plurality of light sources, a plurality of tapered cups laid out in an array, a diffuser, a display module displaying an image, and an image concave mirror being positioned along an optical path sequentially. Each tapered cup is tilted at a different angle and corresponded to one light source respectively to define an emitting angle of each light source. The light of the light sources passes through the diffuser forming a backlight. The display module and the backlight are positioned within and outside the focus of the image concave mirror respectively. The backlight illuminates the image forming an image light and the image light is reflected by the image concave mirror and then projected to a single eye box. Each light source illuminates a portion of the display module. A central normal of each tapered cup intersects the center of the single eye box.

10 Claims, 4 Drawing Sheets

BACKLIT DISPLAY DEVICE WITH TAPERED REFLECTIVE CUP ARRAY

BACKGROUND

Technical Field

The present disclosure is directed to a backlit display device, especially a backlit display device with tapered reflective cup array.

Related Art

The imaging of a backlit display device is to illuminate pixels of a display module through a light source module behind the display module (such as a TFT panel), enabling an image light to be projected to the front and reach a field of view of an observer. The backlight provided by the light source module almost determines the quality of the image light. Therefore, the light of the light source module and the display module are usually provided with a plurality of optical elements therebetween to form a uniform light or adjust a light intensity.

SUMMARY

The present disclosure is directed to a backlit display device with tapered reflective cup array including a light source array, a tapered cup array, a diffuser, a display module and an image concave mirror. The light source array is provided with a plurality of light sources to project a light. The tapered cup array is provided with a plurality of tapered cups. Each tapered cup tilted at a different angle is positioned at a light emitting surface side of the light source array and each tapered cup is corresponded to each light source respectively to define an emitting angle of the light source. The diffuser is positioned at a light emitting surface side of the tapered cup array to boost a uniformity of the light and to form a backlight. The display module displaying an image is positioned at a light emitting surface side of the diffuser to receive the backlight. The backlight illuminates the image to form an image light. The image concave mirror is positioned at a light emitting surface side of the display module. The display module and the backlight are positioned within and outside the focal length of the image concave mirror respectively to form a virtual image and a backlight real image, i.e., a single eye box. Each light source illuminates a portion of the display module and the display module is completely lit when all light sources emit the light simultaneously. A central normal of each tapered cup intersects the center of the single eye box along an extended optical path.

In some embodiment, the tapered cup is a hollow cup with a reflective coating on its surface or a cup-shaped transparent solid light guide.

In some embodiment, each tapered cup is a square frustum. Cup rims of light outlets of two adjacent tapered cups are connected to each other. The light outlet of each tapered cup is aligned and positioned on the same horizontal surface to form a horizontal light source.

In some embodiment, the display module is a TFT (Thin-Film Transistor) panel.

In some embodiment, the diffuser has a flat, plate-like shape.

In some embodiment, a light incident surface side of the diffuser is spaced apart from the light emitting surface side of the tapered cups.

In some embodiment, the light emitting surface side of the diffuser and a light incident surface side are provided with a convex lens array therebetween to converge the backlight and then project the light to the display module.

In some embodiment, the display module and the single eye box are provided with a windshield therebetween on the optical path. The image concave mirror reflects the image light projected from the display module to the windshield, and then the windshield reflects the image light to the single eye box.

In some embodiment, the display module is positioned within the focal length of the image concave mirror. An equivalent distance of the light source array is greater than the focal length of the image concave mirror. The light source array forms a real image inside the windshield.

In some embodiment, the light source array is an LED array.

DETAILED DESCRIPTION

The following descriptions are described with a light emitting direction of a light source array 1 as the front, so as to conform to a common understanding of a person skilled in the art.

Figure 1:
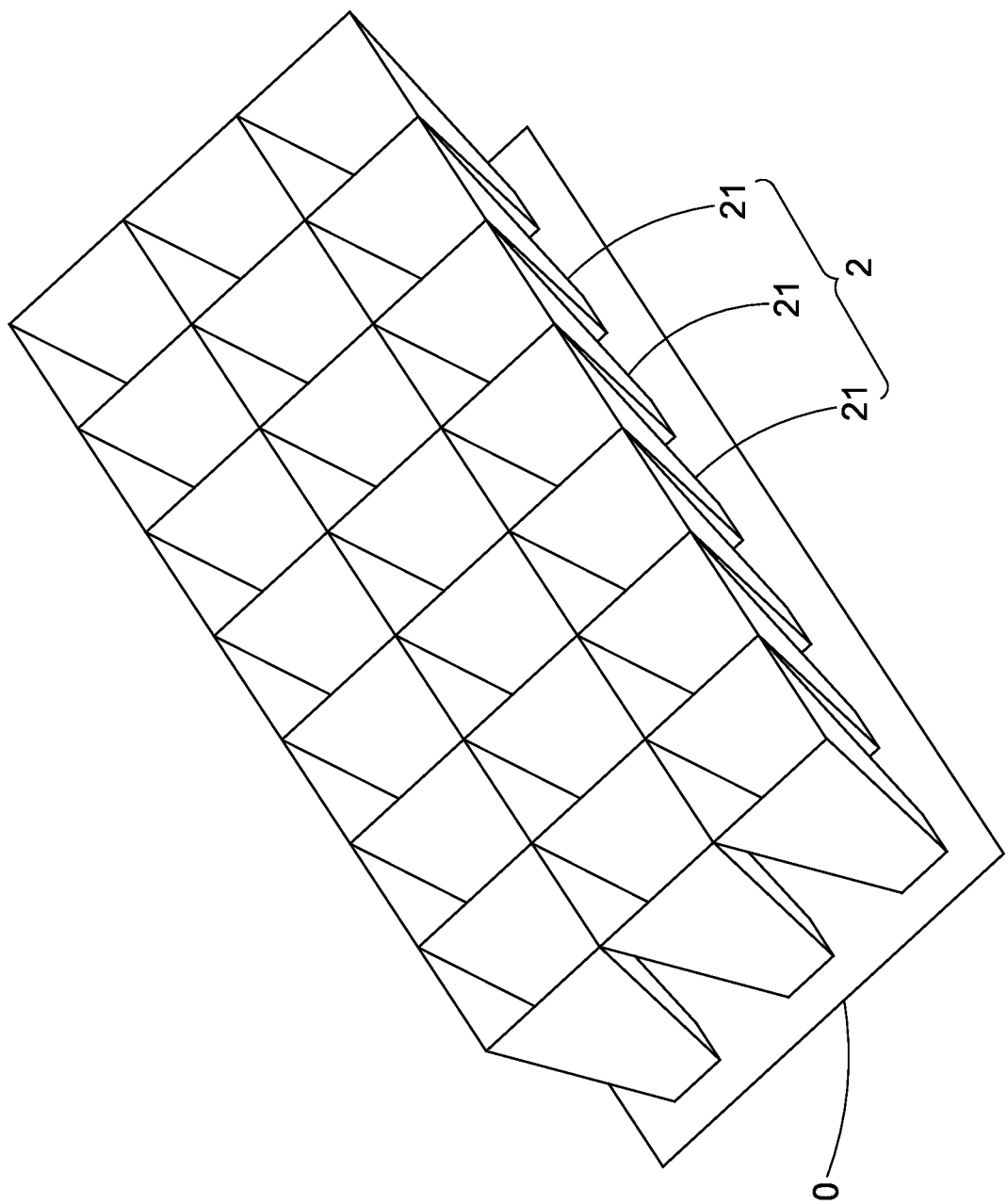
FIG. 1 is a schematic diagram of tapered cups according to some embodiment of the present disclosure.
Figure 2:
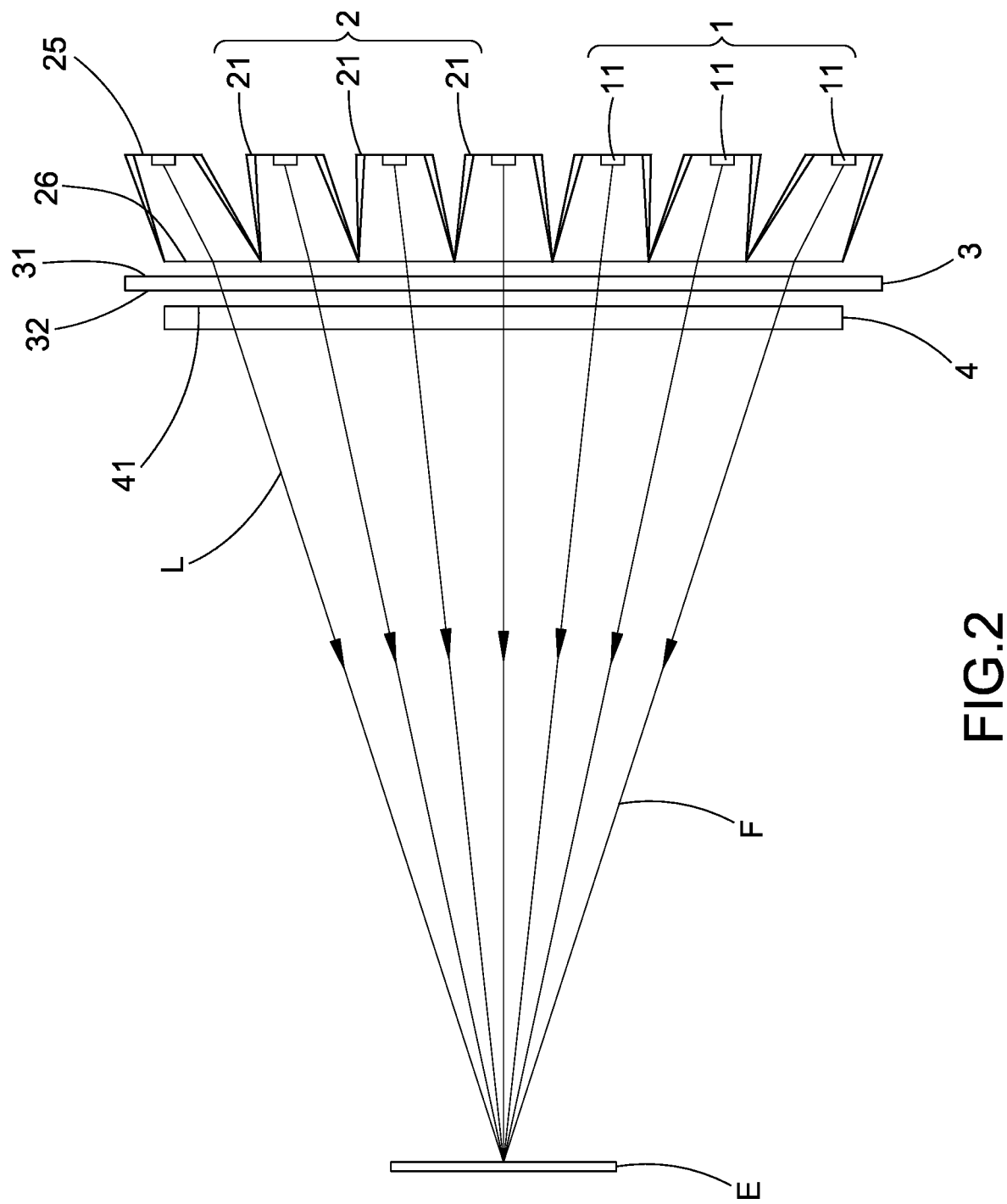
FIG. 2 is a schematic diagram of a structure and an optical path of a display device.
Figure 3:
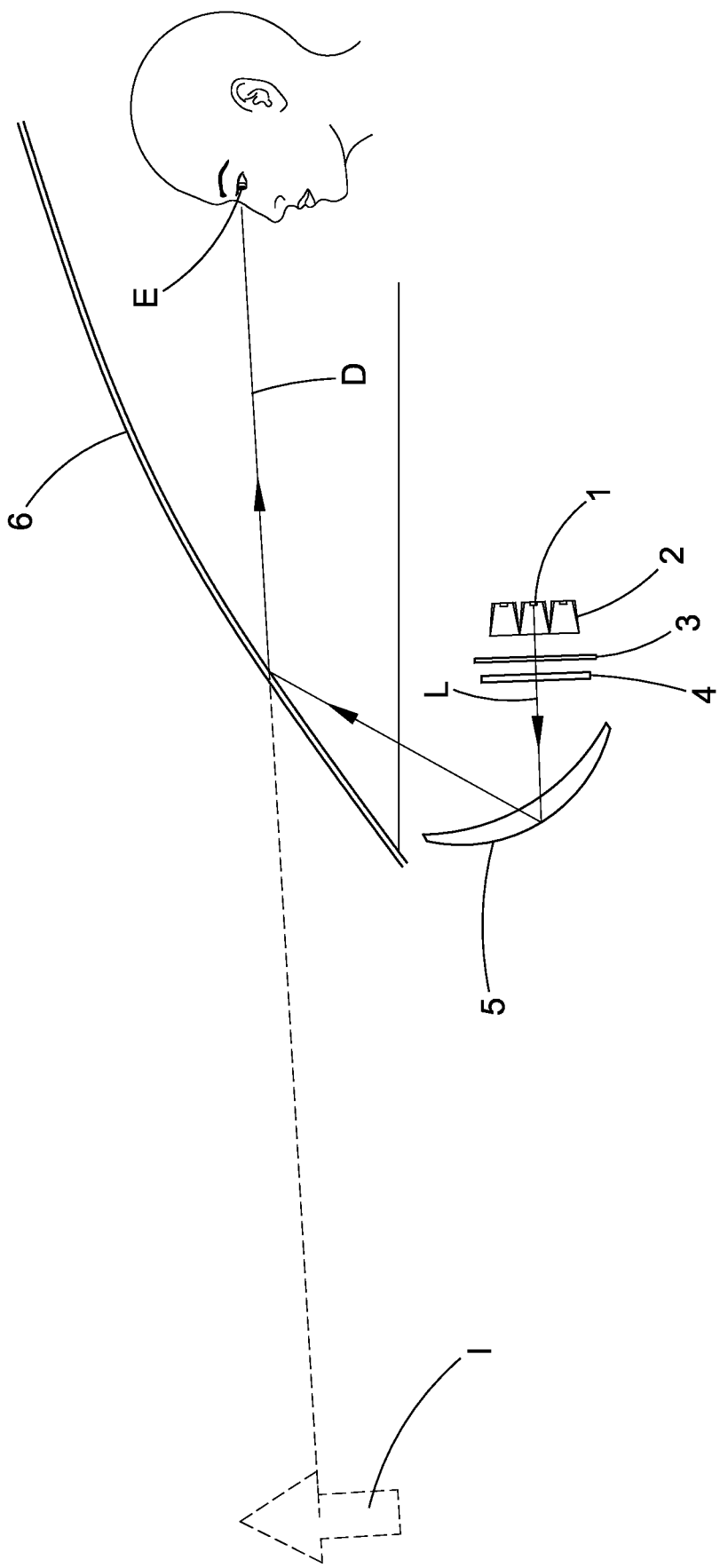
FIG. 3 is a schematic diagram of a structure and an optical path of a head-up display device.

Please refer to FIG. 1-FIG. 3, the present disclosure provides an embodiment of a backlit display device with tapered reflective cup array including a light source array 1, a tapered cup array 2, a diffuser 3, a display module 4, and an image concave mirror 5.

The light source array 1 is provided with a plurality of light sources 11, e.g., The light source array 1 is an LED array positioned on an aluminum substrate 0. The light source array 1 is configured to provide a backlight.

The tapered cup array 2 is provided with a plurality of tapered cups 21. Each tapered cup 21 is tilted at a different angle to define a light incident surface side 25 and a light emitting surface side 26. Each light source 11 (LED) is corresponded to and positioned at the light incident surface side 25 of the tapered cup 21. The tapered cup 21 is a hollow cup with a high reflectivity coating on its surface or a cup-shaped transparent solid light guide. The tapered cup 21 is provided with a light inside being totally reflected when the light hits a cup wall. The tapered cup array 2 is positioned at the light emitting surface side 26 of the light source array 1. A point light source of the LED is reflected inside the tapered cup 21 and the projected to the light emitting surface side 26. Each tapered cup 21 is corresponded to each light source 11 respectively to define an emitting angle of each light source 11.

In some embodiment as shown in FIG. 1, Each tapered cup 21 of the tapered cup array 2 is a square frustum provided with a square light incident surface side 25 (a light inlet) and a square light emitting surface side 26 (a light outlet). Cup rims of light outlets of two adjacent tapered cups 21 are connected to each other.

The diffuser 3 is provided with a light incident surface side 31 aiming at the light emitting surface side 26 of the tapered cup 21 to boost a uniformity of the backlight. The light incident surface side 31 of the diffuser 3 is spaced apart from the light emitting surface side 26 of the tapered cup 21, that is, the diffuser 3 is not completely attached to the light emitting surface side 26 of the tapered cup 21 to prevent a black shadow generated at boundaries among tapered cups 21 from being projected forward.

The display module is a TFT panel displaying an image. The display module 4 is provided with a light incident surface side 41 aiming at a light emitting surface side 32 of the diffuser 3 to receive the backlight to form an image light D.

The image concave mirror 5 is positioned at a light emitting surface side 42 of the display module 4. The display module 4 is positioned within a focal length of the image concave mirror 5 to form a virtual image I. The backlight is positioned outside the focal length of the image concave mirror 5. The concave mirror 5 reflects the light of the backlight to form a backlight real image, i.e., a single eye box E.

Please refer to FIG. 2, it is a schematic diagram of a backlight module applies on a display device. The tapered cup array 2 is provided with a plurality of tapered cups 21 tilted at different angles. The light outlet of each tapered cup 21 is aligned and positioned on the same horizontal surface to enable the light emitting surface side 26 to form a horizontal light source. The light emitting surface side 26 of the tapered cup 21, the diffuser 3, and the light incident surface side 41 of the display module 4 are spaced apart and parallel to one another. A central normal F of each tapered cup 21 intersects the center of the single eye box E along an extended optical path. Each light source 11 illuminates a portion of the display module 4 and the display module 4 is completely lit when all light sources 11 of the light source array 1 emit the light simultaneously. FIG. 2 especially omits the image concave mirror 5 herein.

In some embodiment, an LED array is served as the backlight. Each LED is positioned at the light incident surface side 25 of the tapered cup 21. The tapered cup 21 is provided with the light emitting surface side 26 to form a light emitting surface, the light passing through the diffuser 3 and then projected to the TFT panel to form the image light D (as shown in FIG. 3). Except for the diffuser 3, there are no other optical elements (e.g., reflective mirrors, image concave mirrors, or convex lenses) positioned to form a folded optical path, converge, or form a real image between the light emitting surface side 26 of the tapered cup 21 and the light incident surface side 41 of the display module 4.

Please refer to FIG. 3, it is a schematic diagram of a backlight module applies on a optical path of a head-up display device. In some embodiment, a windshield 6 is included. The image concave mirror 5 reflects the image light D projected from the display module 4 to the windshield 6, and then the windshield 6 reflects the image light D to form an image in a driver's eye box E. The display module 4 is positioned within the focal length of the image concave mirror 5. An equivalent distance of the light source array 1 is greater than the focal length of the image concave mirror 5. The display module 4 forms a virtual image I outside the windshield. The light source array 1 forms a real image eye box E inside the windshield.

Figure 4:
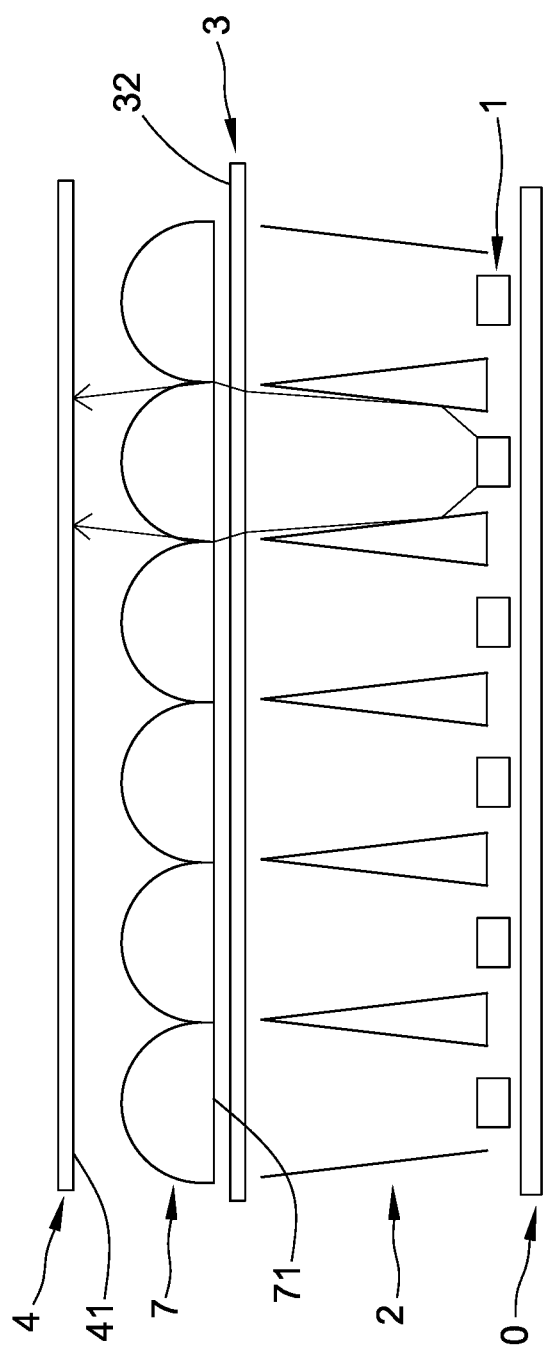
FIG. 4 is a schematic diagram of the display device according to some embodiment of the present disclosure.

Please refer to FIG. 4, as the diffuser 3 boosts the uniformity of the backlight L, an angle of diffusion is enlarged as a result. For this reason, the display device is further provided with a convex lens array 7. The diffuser 3 has a flat, plate-like shape, the convex lens array 7 being positioned at the light emitting surface side 32 of the diffuser 3. The convex lens array 7 is served to narrow a divergence angle of the horizontal light source diffused by the diffuser 3 and adjust to a desired angle, and then the backlight is projected to the rear of the display module 4 (the light incident surface side 41).

In some embodiment, the convex lens array 7 is provided with convex lenses. Each convex lens aims at and covers the light outlet of the tapered cup 21.

What is claimed is:

1. A backlit display device with tapered reflective cup array comprising:
   a light source array, being provided with a plurality of light sources to project a light;
   a tapered cup array, being provided with a plurality of tapered cups;
   wherein each tapered cup tilted at a different angle is positioned at a light emitting surface side of the light source array;
   wherein each tapered cup is corresponded to each light source respectively to define an emitting angle of the light source;
   a diffuser, being positioned at a light emitting surface side of the tapered cup array to provide a uniformity of the light and to form a backlight;
   a display module, displaying an image, being positioned at a light emitting surface side of the diffuser;
   wherein the backlight illuminates the image to form an image light; and
   an image concave mirror, being positioned at a light emitting surface side of the display module;
   wherein the display module is positioned within a focal length of the image concave mirror to form a virtual image;
   wherein the backlight is positioned outside the focal length of the image concave mirror to form a backlight real image as a single eye box;
   wherein each light source illuminates a portion of the display module and the display module is completely lit when all light sources emit the light simultaneously;
   wherein a central normal of each tapered cup intersects the center of the single eye box along an extended optical path.

2. The backlit display device of claim 1, wherein the tapered cup is a hollow cup with a reflective coating on its surface or a cup-shaped transparent solid light guide.

3. The backlit display device of claim 1, wherein each tapered cup is a square frustum; wherein cup rims of light outlets of two adjacent tapered cups are connected to each other; wherein the light outlet of each tapered cup is aligned and positioned on the same horizontal surface to form a horizontal light source.

4. The backlit display device of claim 1, wherein the display module is a TFT (Thin-Film Transistor) panel.

5. The backlit display device of claim 1 wherein the diffuser has a flat, plate-like shape.

6. The backlit display device of claim 1, wherein a light incident surface side of the diffuser is spaced apart from the light emitting surface side of the tapered cups.

7. The backlit display device of claim 1, wherein the light emitting surface side of the diffuser and a light incident surface side of the display module are provided with a convex lens array therebetween to converge the backlight and then project the light to the display module.

8. The backlit display device of claim 1, wherein the display module and the single eye box are provided with a windshield therebetween on the optical path; wherein the image concave mirror reflects the image light projected from the display module to the windshield, and then the windshield reflects the image light to the single eye box.

9. The backlit display device of claim 8, wherein the display module is positioned within the focal length of the image concave mirror; wherein an equivalent distance of the light source array is greater than the focal length of the image concave mirror; wherein the light source array forms a real image inside the windshield.

10. The backlit display device of claim 1, wherein the light source array is an LED array.

* * * * *